US011537400B1

(12) United States Patent
Zhang et al.

(10) Patent No.: US 11,537,400 B1
(45) Date of Patent: Dec. 27, 2022

(54) AUTOMATICALLY MAPPING BINARY EXECUTABLE FILES TO SOURCE CODE BY A SOFTWARE MODERNIZATION SYSTEM

(71) Applicant: Amazon Technologies, Inc., Seattle, WA (US)

(72) Inventors: Jiangtao Zhang, Pleasanton, CA (US); Raviprasad V. Mummidi, Mountain View, CA (US); Bharath Bhoopalam, San Jose, CA (US); Vijay Dheeraj Reddy Mandadi, Fremont, CA (US); Ramu Panayappan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 17/074,315

(22) Filed: Oct. 19, 2020

(51) Int. Cl.
| | |
|---|---|
| *G06F 9/30* | (2018.01) |
| *G06F 8/30* | (2018.01) |
| *G06F 8/51* | (2018.01) |
| *G06F 9/54* | (2006.01) |
| *G06F 8/71* | (2018.01) |
| *G06F 8/75* | (2018.01) |
| *G06F 8/53* | (2018.01) |

(52) U.S. Cl.
CPC .............. *G06F 9/3017* (2013.01); *G06F 8/31* (2013.01); *G06F 8/51* (2013.01); *G06F 8/53* (2013.01); *G06F 8/71* (2013.01); *G06F 8/75* (2013.01); *G06F 9/3005* (2013.01); *G06F 9/541* (2013.01)

(58) Field of Classification Search
CPC . G06F 9/3017; G06F 8/31; G06F 8/51; G06F 8/53; G06F 8/71; G06F 8/75; G06F 9/3005; G06F 9/541
See application file for complete search history.

(56) References Cited

U.S. PATENT DOCUMENTS

| | | | |
|---|---|---|---|
| 8,527,970 B1 * | 9/2013 | Luecke | G06F 8/451 717/145 |
| 11,150,895 B1 * | 10/2021 | Wall | G06F 8/60 |
| 2016/0359697 A1 * | 12/2016 | Scheib | G06F 9/45558 |
| 2018/0268045 A1 * | 9/2018 | Orman | H04L 67/10 |

(Continued)

*Primary Examiner* — Wei Y Zhen
*Assistant Examiner* — Amir Soltanzadeh
(74) *Attorney, Agent, or Firm* — Nicholson De Vos Webster & Elliott LLP

(57) ABSTRACT

Techniques are described for enabling a software modernization system to automatically map binary executable files and other runtime artifacts (e.g., application binaries, Java ARchive (JAR) files, .NET Dynamic Link Library (DLL) files, process identifiers, etc.) to source code associated with the binary executable files, e.g., as part of modernization processes aimed at migrating users' applications to a cloud service provider's infrastructure. A software modernization service of a cloud provider network provides discovery agents and other tools that are capable of creating an inventory of users' software applications and collecting profile data about the software applications. Various techniques are described for automatically identifying the source code associated with software applications identified by a discovery agent in a user's computing environment, thereby improving the efficiency of various software modernization analyses and other modernization processes.

20 Claims, 9 Drawing Sheets

(56) References Cited

U.S. PATENT DOCUMENTS

| | | | |
|---|---|---|---|
| 2020/0034192 A1* | 1/2020 | Kandula | G06F 9/4856 |
| 2020/0341754 A1* | 10/2020 | Kunjuramanpillai | G06F 9/455 |
| 2021/0165641 A1* | 6/2021 | Gilpin | G06F 8/60 |
| 2021/0208934 A1* | 7/2021 | Jadhav | G06F 9/5005 |

* cited by examiner

US 11,537,400 B1

AUTOMATICALLY MAPPING BINARY EXECUTABLE FILES TO SOURCE CODE BY A SOFTWARE MODERNIZATION SYSTEM

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
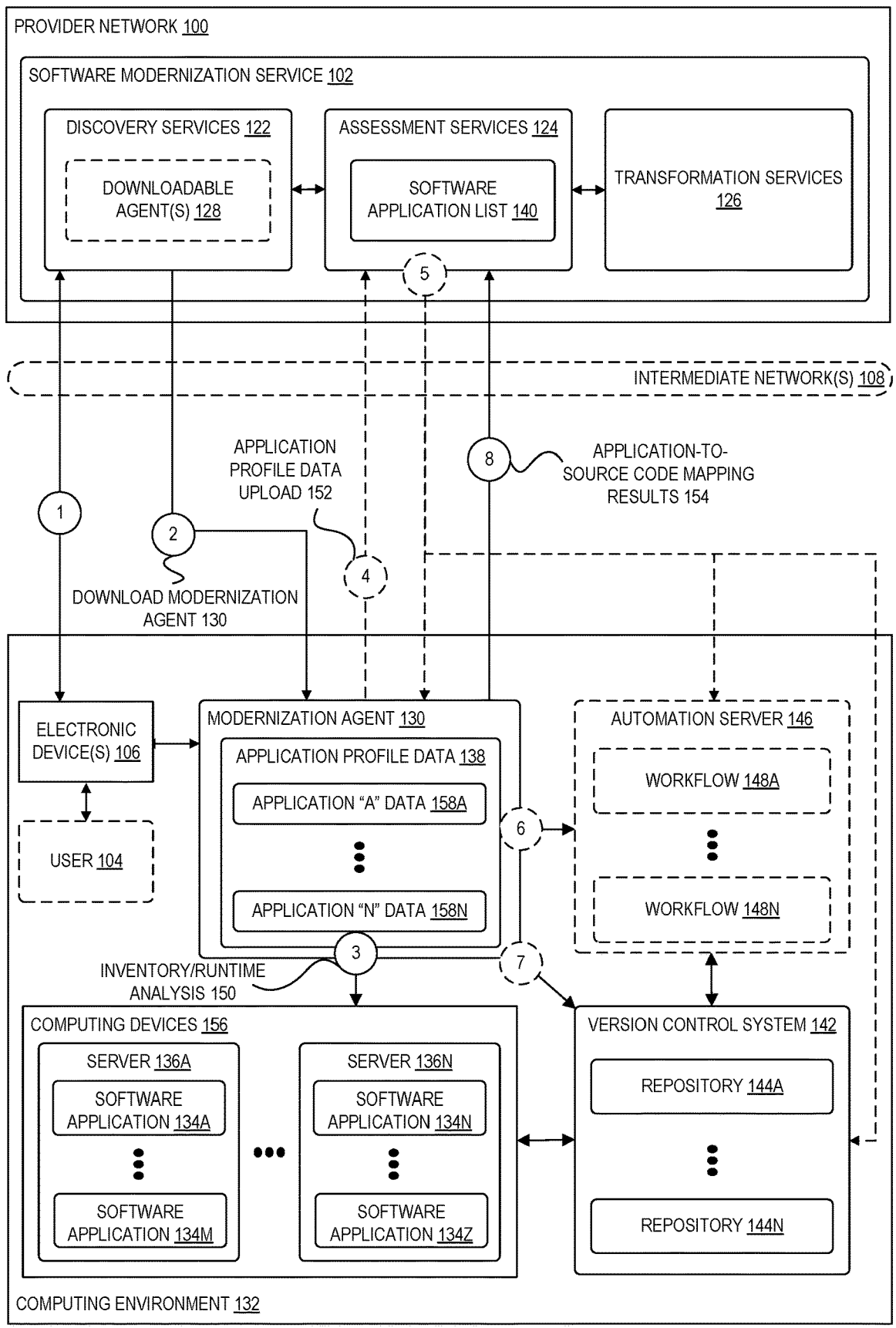
FIG. 1 is a diagram illustrating an environment that enables a software modernization system of a cloud provider network to automatically map binary executable files to source code associated with the binary executable files according to some embodiments.

The present disclosure relates to methods, apparatus, systems, and non-transitory computer-readable storage media for enabling a software modernization system to automatically map binary executable files and other runtime artifacts (e.g., application binaries, Java ARchive (JAR) files, .NET Dynamic Link Library (DLL) files, process identifiers, etc.) to source code associated with the binary executable files, e.g., as part of modernization processes aimed at migrating users' applications to a cloud service provider's infrastructure. In some embodiments, a software modernization service of a cloud provider network provides discovery agents and other tools that are capable of creating an inventory of users' software applications and collecting profile data about the software applications (e.g., including identifiers of binary executable files and other runtime artifacts associated with each of the software applications). The user's computing environment may further include a version control system containing source code repositories corresponding to some or all of the discovered software applications, where the source code contained in such repositories may further serve as valuable data for analysis as part of various modernization processes. However, an explicit link between the software applications discovered by a discovery agent and the location of the source code used to implement each of the software applications typically does not exist. According to embodiments described herein, various techniques are described for automatically identifying the source code associated with software applications identified by a discovery agent in a user's computing environment thereby improving the efficiency of various software modernization analyses and other modernization processes.

Software modernization broadly refers to converting, rewriting, or porting legacy software applications or systems to more modern computer programming languages, software libraries, protocols, hardware platforms, application architectures, cloud-based services, and the like. Users, business organizations, and other entities often desire to modernize their various software applications and systems to improve operational performance, to increase application availability, to reduce exposure to vulnerabilities (e.g., software crashes, security vulnerabilities, etc.), to migrate applications from non-cloud environments to infrastructure provided by a cloud services provider (e.g., to leverage a cloud service's provider reliable infrastructure, increased performance benefits, etc.), and to enable more efficient ongoing development of the applications, among other possible reasons.

For users associated with a computing environment comprising many different software applications (e.g., various types of web applications, database applications, other server applications, desktop applications, etc.), the software modernization process often begins with identifying an inventory of software applications in the environment that may be candidates for various modernization processes. As indicated above, a user might use a discovery agent or other type of application installed in the user's environment to help automatically identify applications within the user's environment (e.g., by identifying and analyzing applications executing on various servers throughout the user's computing environment accessible to the agent). A user might further provide access to various data associated with the applications for additional analysis such as, for example, an analysis of the source code used to implement each of the applications. For example, once an inventory of software applications has been created, the user might manually specify identifiers of respective source code repositories (e.g., such as a web address used to access a repository) for some or all of the identified software applications. However, if a user's computing environment has tens or hundreds of different applications running across any number of servers, the process of manually identifying the location of a source code repository associated with each of the applications represents a challenging and error-prone task.

The aforementioned challenges, among others, are addressed by a software modernization system that is capable of automatically and efficiently mapping binary executable files (e.g., executable files discovered in a user's computing environment by a discovery agent) to source code associated with the binary executable files (e.g., source code located in a source code repository that is used to implement the software associated with the binary executable files). In some embodiments, the software modernization system identifies such mappings by performing one or more of: querying an automation server (e.g., a server, service, or application used to automate various software build and deployment tasks) for information that can help identify a mapping to associated source code, by generating and comparing hash signatures representing the source code and decomposed versions of binary executable files, by comparing other types of binary executable file information against source code repositories, and the like. Among other benefits, the ability to automatically map binary executable files to source code repositories provides for more efficient software modernization processes, thereby also improving the efficiency, robustness, scalability, and general performance of the associated software applications undergoing modernization processes.

FIG. 1 is a diagram illustrating an environment that enables a software modernization service 102 of a cloud provider network 100 to automatically map binary executable files to source code associated with the binary executable files according to some embodiments. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") (e.g., a user 104) of provider networks 100 may utilize one or more user accounts that are associated with a customer account, though these terms may be used somewhat interchangeably depending upon the context of use. Users may interact with a provider network 100 via an electronic device (e.g., electronic device(s) 106) across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network 100 typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZs of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance (s) involved.

The cloud provider network 100 typically includes other services in addition to the software modernization service 102. A hardware virtualization service, for example, (referred to in various implementations as an elastic compute service, a virtual machines service, a computing cloud service, a compute engine, or a cloud compute service), for example, can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, the cloud provider network 100 includes a container service. A container service can be a container orchestration and management service (referred to in various implementations as a container service, cloud container service, container engine, or container cloud service) that allows users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

An on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In some embodiments, a software modernization service 102 provides various types of software modernization services and functionality including discovery services 122, assessment services 124, and transformation services 126, collectively aimed at helping users discover and use recommended transformation and migration paths for their software applications. The discovery services 122, for example, include various services, software applications, software agents, and other tools (e.g., including downloadable agents 128) used to identify software applications in users' computing environments and to collect profile information for software applications undergoing modernization processes. The assessment services 124 enable users and applications to obtain various types of software modernization assessments and recommendations, e.g., based on profile information about users' applications collected by the discovery services 122 and associated tools. For example, the recommendations generated by an assessment service 124 can include recommended modernization strategies, recommended modernization tools, estimated modernization costs, etc.

As indicated above, according to embodiments described herein, a software modernization service 102 provides services, agents, applications, and other tools that enable the automatic mapping of binary executable files to source code associated with the binary executable files. For example, in FIG. 1, user 104 might install a modernization agent 130 on a computing device in a computing environment 132 in order to inventory and analyze software applications running in the user's computing environment (e.g., any number of software applications 134A, . . . , 134M, 134N, . . . , 134Z, running on any number of separate servers 136A-136N (e.g., physical or virtual servers), which may be executing on any number of computing devices 156. As described in more detail herein, the user 104 can cause the modernization agent 130 to inventory and analyze some or all of the software applications 134A-134Z, resulting in application profile data 138 and including respective application profile data for individually identified software applications (e.g., application "A" data 158A through application "N" data 158N). In some embodiments, the application profile data 138 can be uploaded to and stored by the modernization service 102, where the modernization service 102 may then maintain a software application list 140 identifying the discovered software applications associated with a user of the provider network 100.

In some embodiments, a modernization agent 130 initially collects dynamic runtime information about discovered software applications including, e.g., process identifiers, runtime artifacts such as binary executables, JAR files, DLL files, etc. While the runtime information obtained by the modernization agent 130 about discovered software applications is useful, additional information beneficial to modernization analyses can be obtained based on an analysis of the source code used to implement each of the identified software applications. The source code, for example, might be stored in a version control system 142 or other storage location within the user's computing environment 132 or elsewhere. In some embodiments, a user provides a modernization agent 130, software modernization service 102, or both, with authentication information (e.g., a username and password, security token, etc.) that can be used to access the version control system based on an identifying URL or other access identifier. However, the modernization agent 130 may still lack information indicating which repository or repositories in a version control system 142 (e.g., one or more of repository 144A-repository 144N) corresponds to each software application identified in the user's computing environment 132 (e.g., repository 144C might contain the source code used to implement a software application 134J, while repository 144Q contains the source code used to implement a different software application 134R, and so forth; however, such mappings between the source code and applications might be known only a user 104).

In some embodiments, to assist with creating mappings between identified binary executable files and corresponding source code, a user 104 may further configure the modernization agent 130 with the ability to access an automation server 146 in the user's computing environment, the provider network 100, or elsewhere. In some embodiments, the automation server 146 broadly represents any type of server, service, application, or other tool that helps automate various software development processes such as, for example, building, testing, and deploying software applications. An automation server 146, for example, may automate such processes in an effort to facilitate a continuous integration and continuous delivery approach to software development and deployment. In some embodiments, the automation server 146 is a server-based system that interfaces with version control tools (e.g., a version control system 142) to identify changes to a repository (e.g., code commits) or other events and may further include configurations used to automate one or more actions responsive to the detection of such events. In some embodiments, users can use an automation server 146 to configure any number of workflows (sometimes also referred to as "jobs," "pipelines," or "projects"), each representing a defined configuration of automated processes for building, testing, and/or deploying software applications (e.g., illustrated by stored workflows 148A-148N). In this example, each workflow may be associated with a configuration file or other data that defines various actions, parameters (e.g., locations of source repositories, names of binary executable files to be generated, locations at which to store binary executable files, etc.). In some embodiments, an automation server 146 provides an interface (e.g., a network-accessible API) via which users and applications can request server-related information and perform various actions including, e.g., obtaining a list of configured workflows, obtaining configuration information associated with configured workflows, creating new workflows, etc.

In FIG. 1, the circles labeled "1"–"8" illustrate an example process in which a user obtains a modernization agent 130 to inventory and analyze software applications in the user's computing environment, and the modernization agent 130 and/or software modernization service 102 automatically creates a mapping between identified software applications and the source code used to implement the software applications. In some embodiments, at circle "1" in FIG. 1, a user accesses the software modernization service 102 (for example, via various interfaces provided by discovery services 122) to obtain information about available modernization services and tools and to download one or more downloadable agents 128. In some embodiments, at circle "2," a modernization agent 130 is downloaded and installed on servers within a user's on-premises computing environment 134 (e.g., on a physical server or VM). In some embodiments, users (e.g., a user 104) can use a computing device 106 to interact with the modernization agent 130 via a command line interface (CLI), graphical user interface (GUI), or any other type of interface provided by the modernization agent 130.

As part of the assessment process, in some embodiments, at circle "3," a user invokes an "inventory" command provided by an modernization agent 130 used to identify applications within the user's computing environment 132 that can be assessed (e.g., including some or all of software applications 134A-134N in the example of FIG. 1) and to perform various runtime analyses of the identified applications. In some embodiments, instead of interacting directly with the modernization agent 130, the user 104 may instead interact with a web-based console or other interface provided by the software modernization service 102. The software modernization service 102 may then in turn instruct an modernization agent 130 or other applications running in the user computing environment 132 to perform some or all of the inventory/runtime analysis 150 operations described in reference to FIG. 1 such as, for example, identifying an inventory of applications, obtaining application profile data 138 for the applications (e.g., including binary executable file information identifying JAR files, DLL files, process identifiers, etc.), among other possible application profiling information.

In some embodiments, at circle "4," the modernization agent 130 optionally uploads 152 the obtained application profile data 138 including identifiers of the discovered software applications in the user's computing environment 132. The assessment service 124 may use the uploaded application profile data 138, for example, to create a software application list 140 that associates the identified software applications with a user account used by the user 104. The software application list 140, for example, may be displayed to a user in a GUI or other interface to provide a user with information about the discovered set of applications in the user's computing environment 132. In other embodiments, the application profile data 138 is stored only locally by the modernization agent 130.

In some embodiments, at circle "5," either an assessment service 124 or modernization agent 130 initiates processes used to map some or all of the software applications identified by the modernization agent 130 to source code used to implement the software applications (e.g., to identify one or more repositories stored by the version control system 142 to identified software application 134A-134N). In some embodiments, the mapping process is performed by the agent 130 automatically or in response to a user request to perform the mapping (e.g., either via input received by the agent directly or via input received via an assessment service 124). In some embodiments, if the user's computing environment includes an accessible automation server 144, at circle "6," a modernization agent 130 attempts to identify a mapping for some or all of the identified applications based on workflow information stored by the automation server.

Figure 2:
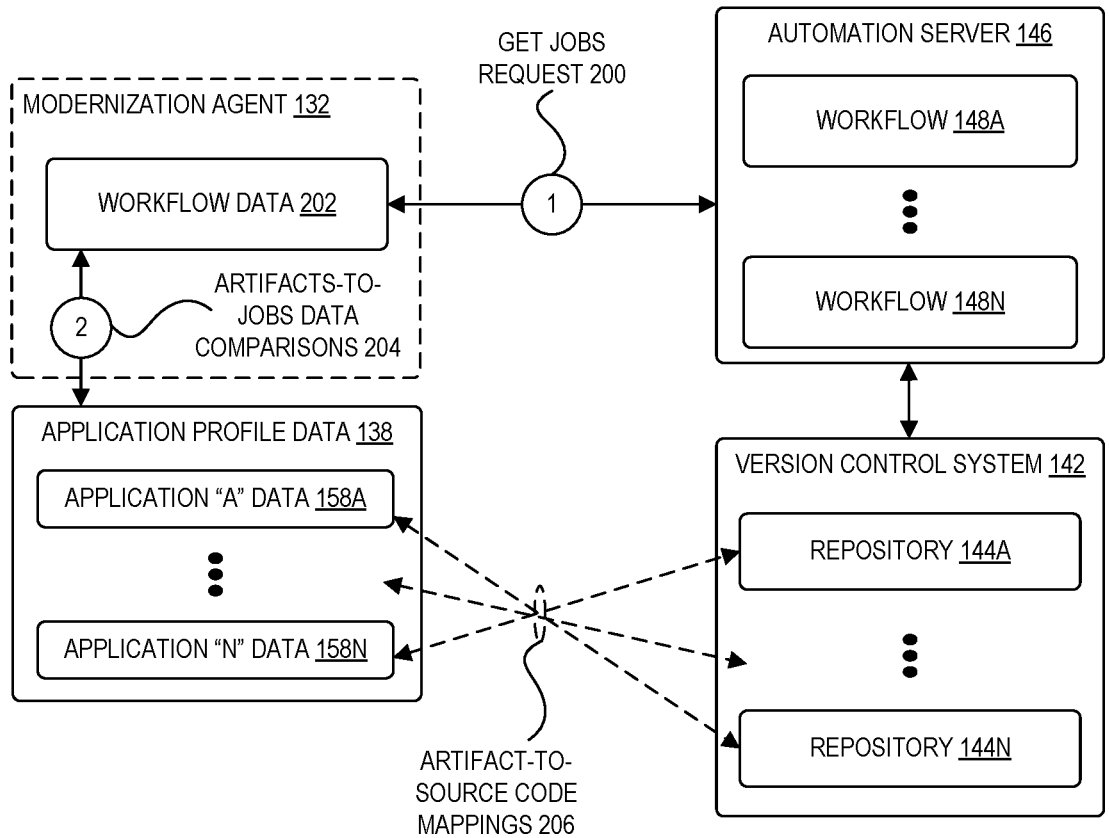
FIG. 2 is a diagram illustrating the identification of source code associated with binary executable files by querying workflow configuration data managed by an automation server according to some embodiments.

FIG. 2 is a diagram illustrating the identification of source code associated with binary executable files or other runtime artifacts by querying an automation server according to some embodiments. As indicated above, an automation server 146 typically includes some number of configured workflows 148A-148N each defining automated processes related to building, testing, deploying, etc., software applications. In some embodiments, the configuration information associated with a workflow stored by an automation server may include information that serves as an explicit mapping between binary executable files or other runtime artifacts and a corresponding source code repository, e.g., based on a configuration file or other data that includes an identifier of a binary executable file or other runtime artifact and an identified location of a storage repository within the version control system 142 storing associated source code. For example, a workflow configuration file might include build configurations that specify a repository identifier from which source code is obtained and further specify a name of a binary executable file resulting from the build process.

In some embodiments, to obtain such workflow configuration information, at circle "1" in FIG. 2, a modernization agent 130 (or assessment service 124) queries the automation server 146 for workflows configured and managed by the automation server 146 by sending a get workflows request 200. The workflow data 202 returned by the automation server 146 may include, for example, identifiers of each workflow, identifiers of a latest build, names and storage locations of associated binary executable files or other runtime artifacts, identifiers of associated source code repositories, etc. In some embodiments, a modernization agent 130 or assessment service 124 may use obtained workflow configuration information to derive the identifiers or storage locations of associated binary executable files, e.g., by causing a build and deploy tool to execute some or all of an obtained workflow configuration. In some embodiments, at circle "2," the modernization agent 130 or assessment service 124 compares 204 the values contained in the workflow data 202 against the application profile data 138 for one or more of the discovered applications (e.g., which also includes the names of binary executable files and other runtime artifacts) to identify any runtime artifact-to-workflows matches. In some embodiments, if the agent 130 identifies a workflow from workflow data 202 that appears to include configuration information matching the binary executable file information for a particular software application, the agent 130 or assessment service 124 can create an artifact-to-source code mapping 206 based on an identifier of a source code repository in the corresponding workflow data. In some embodiments, the runtime artifact-to-source code mappings 206 may be stored in a file or other data structure and optionally uploaded to the modernization service 102. In some embodiments, once the source code repository is identified for a particular application, the modernization agent 130 may further obtain the source code from the identified repository and perform various modernization analyses on the identified source code and provide the results to the modernization service 102.

Figure 3:
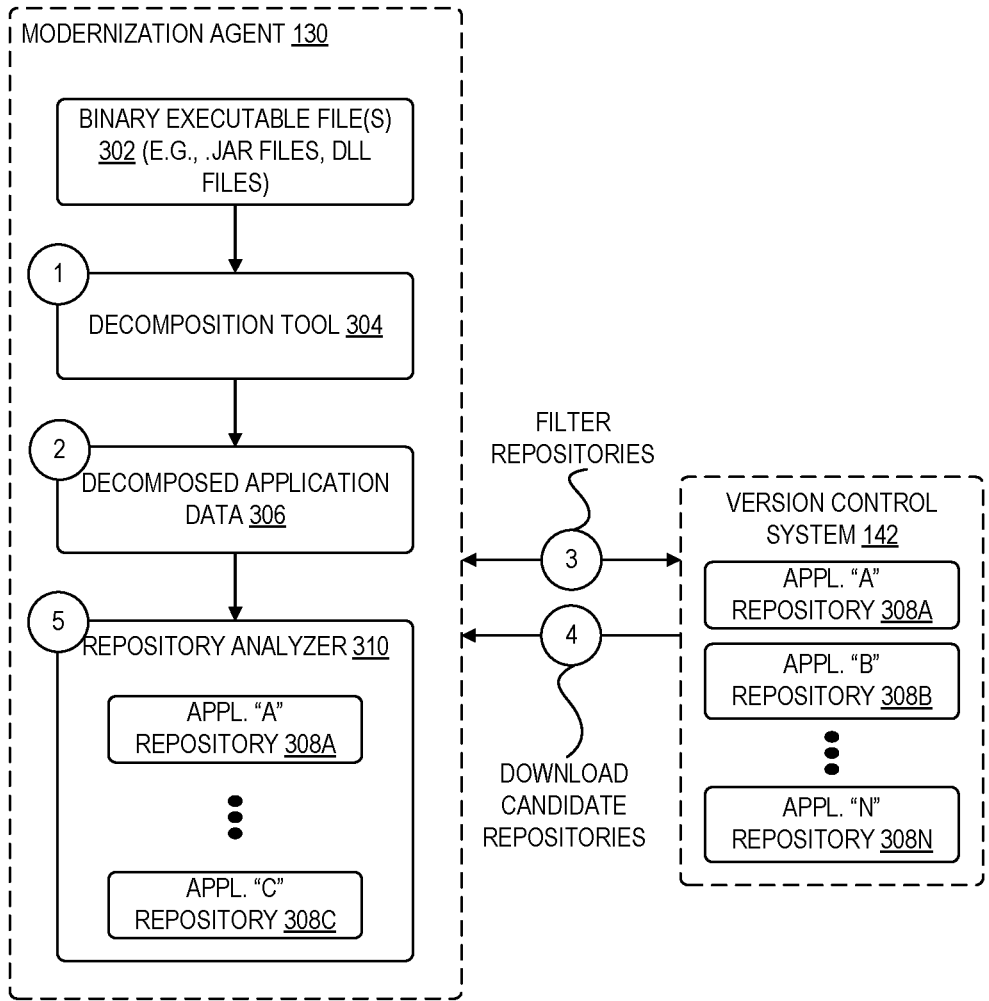
FIG. 3 is a diagram illustrating a process for filtering candidate software application repositories based on decomposed application data obtained from a binary executable file according to some embodiments.
Figure 4:
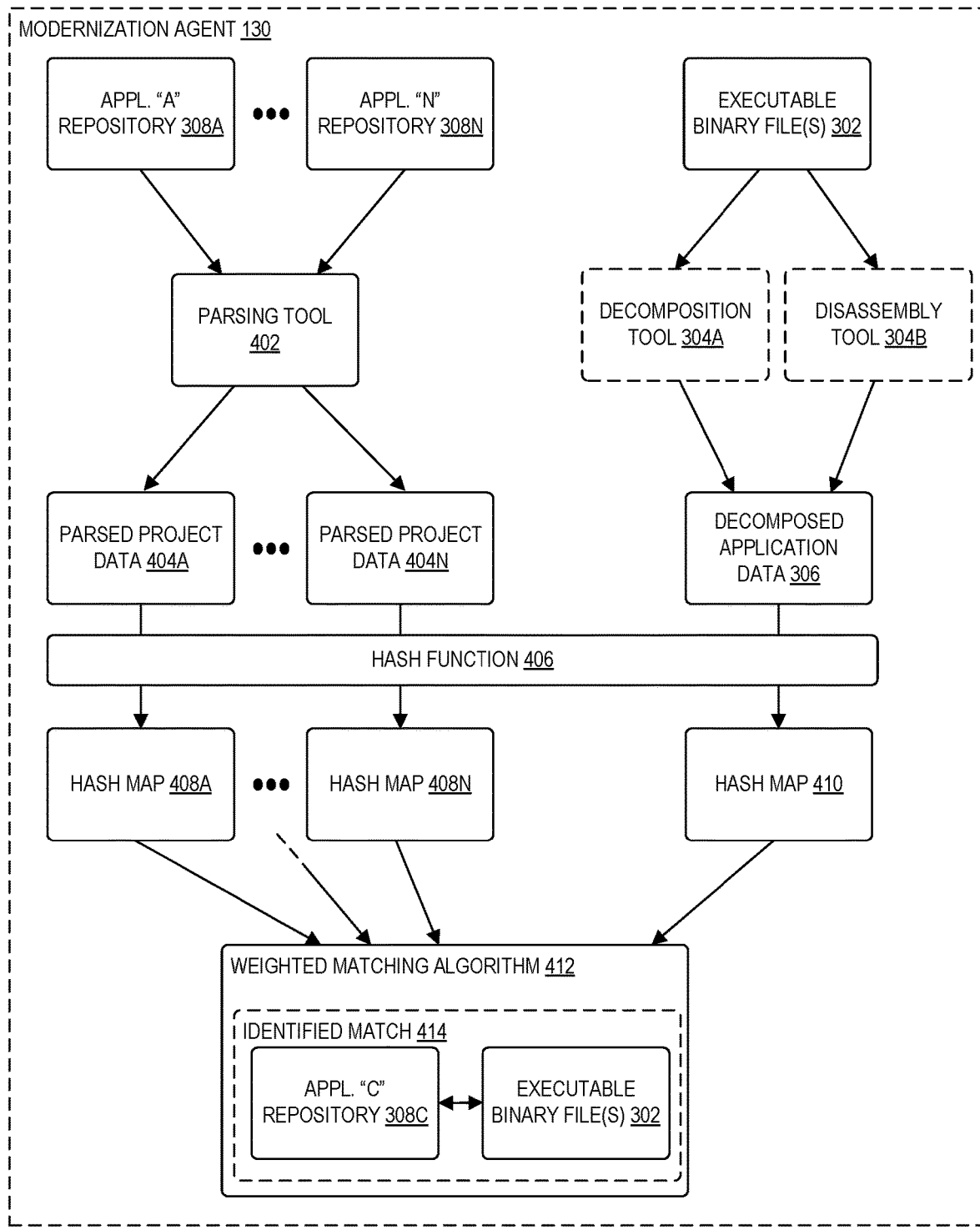
FIG. 4 is a diagram illustrating the identification of source code repositories associated with binary executable files based on a matching of hash maps derived from the binary executable files and source code repositories according to some embodiments.

In some embodiments, a user's computing environment 132 may not include an automation server 146, or the binary executable files associated with an application may not be located in the workflow data stored by the automation server 148. In some embodiments, at circle "7," a modernization agent 130 can perform other processes to identify the source code associated with one or more discovered software applications, e.g., based on a decomposition of the binary executable files associated with the applications. FIG. 3 and FIG. 4 are diagrams illustrating the identification of source code based on decomposing binary executable files associated with a software application according to some embodiments. In some embodiments, some or all of the processes are performed by the modernization agent 130 running in the user's computing environment 132. In other embodiments, some or all of the processes are performed by computing devices provided by the cloud provider network 100 configured to remotely access the automation server 146, version control system 142, or both, or otherwise having access to the runtime artifacts and code repositories (e.g., based on the data having been uploaded to the provider network 100). As shown, the analysis is performed relative to binary executable file(s) 302 or other runtime artifacts collected by the modernization agent 130 for the discovered applications in the user's computing environment 132.

In some embodiments, at circle "1" in FIG. 3, a decomposition tool 304A or disassembly tool 304B is used to decompose or disassemble one or more binary executable files 302 associated with the software application. In some embodiments, a decomposition tool 304A is configured to enable the analysis, creation, and manipulation of binary executable files (e.g., .jar and Java class files, DLL files, etc.), for example, to discover the names or other identifiers of class names, method names, package dependencies, and possibly other characteristics of the code used to implement the binary executable files. In some embodiments, the modernization agent 130 (or modernization service 102 process) invokes execution of the decomposition tool 304A or disassembly tool 304B on the binary executable file(s) 302 resulting, at circle "2," in decomposed application data 306 containing the symbolic information of particular classes or other components of the classes, e.g., methods, fields, byte code instructions, etc., or other similar information obtained by disassembling the binary executable files.

In some embodiments, at circle "3," the modernization agent 130 or modernization service 102 filters out repositories managed by the version control system 142 that are associated with programming languages, frameworks, or other application characteristics that are incompatible with the binary executable file(s) 302 or decomposed application data 306. For example, if the application is Java-based (e.g., the binary executable file is a JAR file) or uses a particular framework, then the modernization agent 130 filters out for analysis any repositories managed by the version control system 142 that are associated with applications developed in the .NET language or that use a framework that is incompatible with a framework identified by the decomposed application data 306. In some embodiments, the modernization agent 130 further filters repositories based on a comparison of filenames in the repository and filenames identified in the decomposition of the binary executable file(s) 302. For example, the modernization agent 130 may scan each repository and filter out any repositories that are associated with a low similarity of filenames contained in with the binary executable file(s) 302 (e.g., containing 50% or less similarity, or based on any other defined threshold). In some embodiments, at circle "4," the modernization agent 130 or modernization service 102 downloads the candidate repositories for analysis (e.g., repositories not filtered out for being incompatible with or overly dissimilar to the binary executable file(s) 302).

In some embodiments, at circle "5," a repository analyzer 310 analyzes the downloaded candidate repositories to identify a repository likely to match the binary executable file(s) 302. Although the high-level example illustrated in FIG. 3 involves finding a matching repository for a single application, the matching process may be performed sequentially or concurrently on any number of separate applications identified by the discovery processes described above. In some embodiments, in cases where the source code repositories are uploaded to a modernization service 102 for analysis, the matching processes can be performed concurrently using any number of concurrently executing resources of the cloud provider network 100.

FIG. 4 is a diagram illustrating the identification of source code associated with binary executable files based on a weighted matching of hash signatures derived from the binary executable files and source code according to some embodiments. As shown, the analysis involves a comparison of one or more repositories 308A-308N (e.g., candidate repositories identified by the processes described in FIG. 3) and executable binary file(s) 302 associated with a software application. In some embodiments, decomposed application data 306 is generated from the executable binary file(s) 302 using decomposition tools 304, as described above. In some embodiments, the process further includes generating, for the source code contained in each of the repositories 308A-308N, parsed project data 404A-404N using a parsing tool 402. Similar to decomposed application data 306, the parsed project data generally may include identifiers of file names, class names, namespaces, packages, method names, or any other characteristics of the source code contained in the repositories. In some embodiments, the parsed project data and decomposed application data 306 is further filtered to omit highly common package, method names (e.g., common system imports, common class entry point names, etc.) that do not serve as useful identifying characteristics.

In some embodiments, a hash function 406 is then applied to aspects of the parsed project data 404A-404N and decomposed application data 306 to generate hash maps 408A-408N (e.g., corresponding to the parsed project data 404A-404N) and hash map 410. The hash maps, for example, may include a plurality of hash values generated based on various identifiers included in the parsed project data and decomposed application data (e.g., file names, class names, method names, variable names, package names, etc.). In some embodiments, a weighted matching algorithm 412 is then used to identify a repository most likely to correspond to the executable binary file(s) 302 based on a comparison of the hash values of the hash map 410 and each of the hash maps 408A-408N. For example, the weighted matching algorithm 412 may more heavily weight the hash value matches corresponding to method names over hash value matches corresponding to package names, or more heavily weight matching class names over matching file names, etc. In some embodiments, the process may select a best matching repository as an identified match 414, e.g., based on a repository or repositories that include a greatest number or percentage of matching hash values. In some embodiments, the process may identify multiple possible matching repositories and request input from the user selecting a match from a set of possible matching repositories.

In some embodiments, another process discovered binary executable files or other runtime artifacts to candidate source code repositories involves extracting symbol tables or assembly binary code from the binary executable files and comparing information contained therein to a filtered set of repositories as described above. For example, applications implemented using some programming languages may not be associated with an intermediate language that can be easily decomposed by a decomposition tool as described above. A symbol table may however contain various semantic information (e.g., variable and function names, classes, objects, etc.) that can be used to compare against the source code in obtained candidate repositories. For example, a hash function can be used to generate one or more signatures based on the semantic information extracted from the symbol tables and compared against similar signatures generated based on application repositories, as described above in reference to FIG. 3 and FIG. 4. In some embodiments, if symbol tables are not included in the binary executable file(s), other tools can be used to obtain assembly language code associated with the binary executable files (e.g., by disassembling the binary executable files), which can be similarly used to perform comparisons against a set of application repositories (e.g., by obtaining assembly code data by compiling source code contained in the repositories).

Returning to FIG. 1, at circle "8," the modernization agent 130 sends any identified application-to-source code mapping results 154 to an assessment service 124. In some embodiments, the assessment service 124 stores the application-to-source code mappings, e.g., as part of the software application list 140. In some embodiments, based on the mappings, the modernization agent 130 or modernization service 102 can obtain the source code for each application and perform static analyses on the source code to provide various types of modernization recommendations for each application, among other uses. In some embodiments, the modernization service 102 provides a web-based console displaying information about the identified mappings and enabling a user to request various types of analyses on the identified source code.

Figure 5:
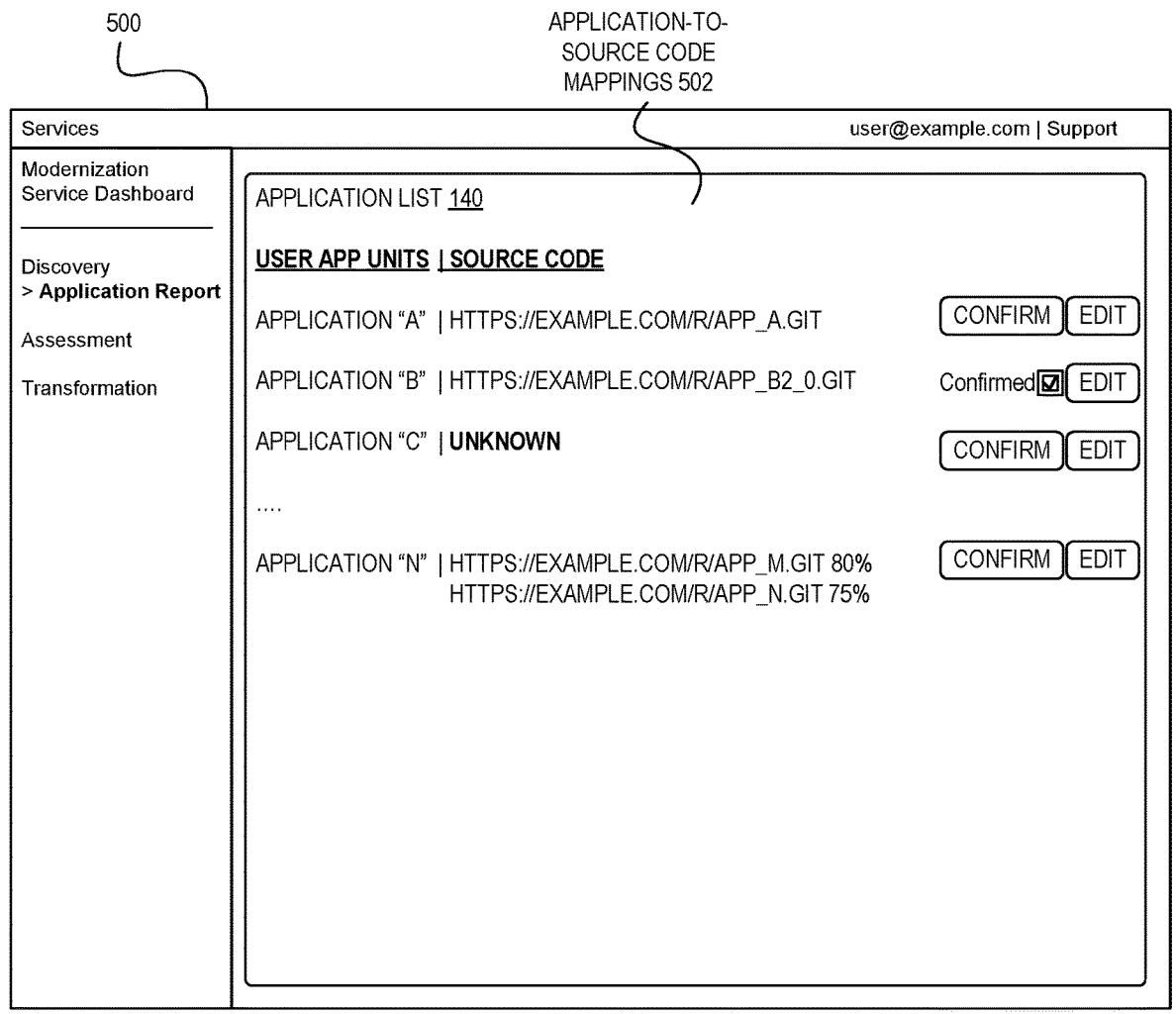
FIG. 5 is a diagram illustrating a graphical user interface (GUI) displaying automatically discovered software application-to-source code mappings according to some embodiments.

FIG. 5 is a diagram illustrating a graphical user interface (GUI) displaying a mapping between identified applications and identified source code. As shown, the GUI 500 includes the display of application-to-source code mappings 502 identified based on the processes described herein. The mappings indicate, for example, a name of each software application or "app unit" identified by a modernization agent 130 and, if found, an identifier of a repository automatically mapped to the application. In some embodiments, the GUI 500 further includes interface elements that enable a user to confirm the identified mapping or to edit or manually specify a mapping. In some embodiments, a user can further provide input requesting an analysis of the identified source code to provide modernization recommendations.

In some embodiments, once the source code for an application is identified and obtained by the modernization service 102 or modernization agent 130, the source code can be analyzed to obtain data useful to various modernization recommendation processes. The analysis results may include various application attributes such as, for example, an application type, a programming language used to develop the application, integrations with other systems, architecture type (e.g., monolithic, 3-tier, microservice-based, etc.), application dependencies (e.g., on third party software and libraries, other libraries and files, execution environments), application relationships (e.g., network connections, inter-process communications (IPC), remote procedure calls (RPC)), data flow and network throughput, and the like. In some embodiments, based on any provided recommendations, one or more transformation services 126 can be used to modernize one or more of the software applications discovered in the user's computing environment 132.

Figure 6:
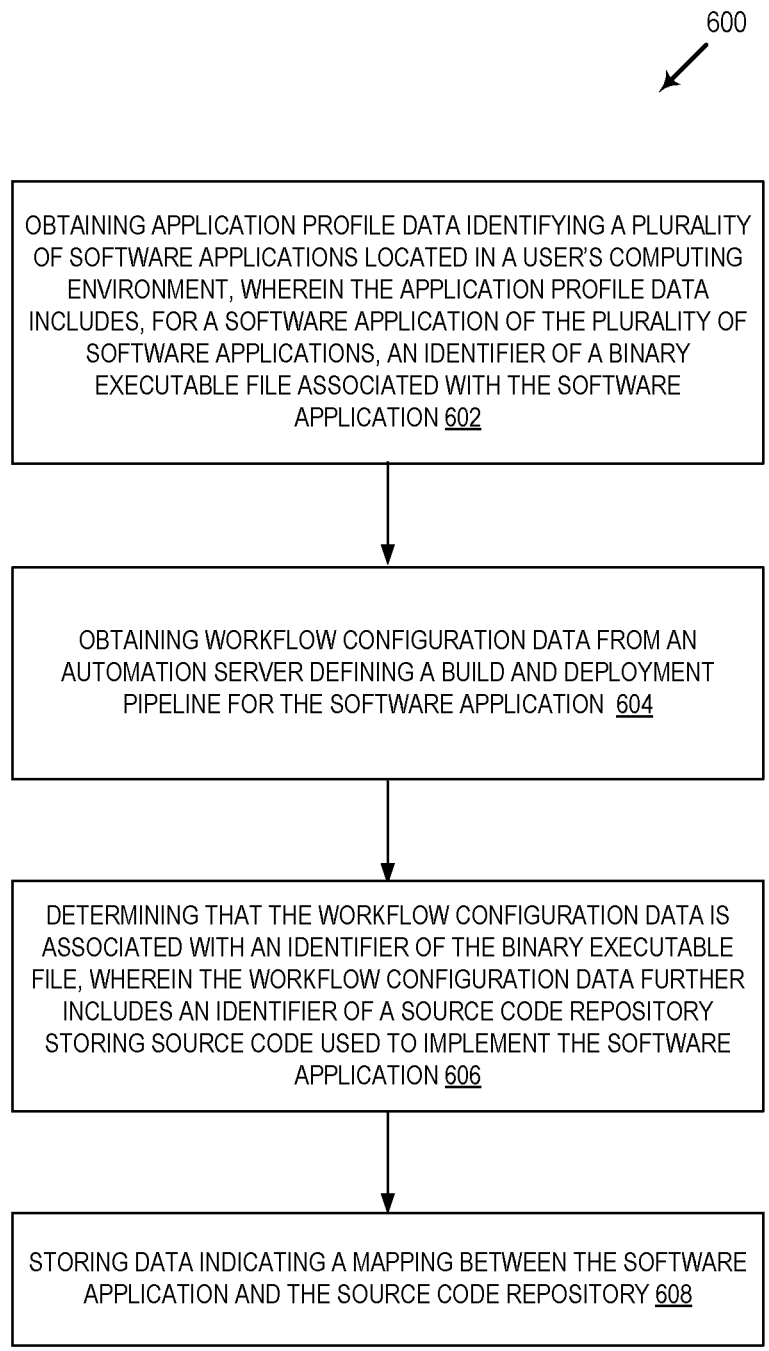
FIG. 6 is a flow diagram illustrating operations of a method for automatically mapping binary executable files to source code repositories by a software modernization system according to some embodiments.

FIG. 6 is a flow diagram illustrating operations 600 of a method for automatically mapping binary executable files to source code repositories by a software modernization system according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the modernization service 102, modernization agent 130, or other components or combinations thereof of the other figures.

The operations 600 include, at block 602, obtaining application profile data identifying a plurality of software applications located in a user's computing environment, wherein the application profile data includes, for a software application of the plurality of software applications, an identifier of a binary executable file associated with the software application.

The operations 600 further include, at block 604, obtaining workflow configuration data from an automation server defining a build and deployment pipeline for the software application.

The operations 600 further include, at block 606, determining that the workflow configuration data includes an identifier of the binary executable file, wherein the workflow configuration data further includes an identifier of a source code repository storing source code used to implement the software application.

The operations 600 further include, at block 608, storing data indicating a mapping between the software application and the source code repository.

In some embodiments, the binary executable file associated with the software application is a first binary executable file associated with a first software application, wherein the mapping is a first mapping, wherein the source code repository is a first source code repository, and wherein the operations further include: determining that a workflow configuration matching a second binary executable file associated with a second software application does not exist in the plurality of workflow configurations; decomposing the second binary executable file to obtain decomposed application data, wherein the decomposed application data includes identifiers of at least one of: a class associated with the binary executable file, a method associated with the binary executable file, or a package associated with the binary executable file; using a hash function to generate a hash map based on the decomposed application data; comparing the hash map against hash maps generated based on each of a plurality of source code repositories managed by a version control system to identify a matching second source code repository; and storing data indicating a second mapping between the second software application and the second source code repository.

In some embodiments, the operations further include obtaining source code associated with the software application from the source code repository; performing a static analysis of the source code; and generating a modernization recommendation based at least in part on the static analysis of the source code.

Figure 7:
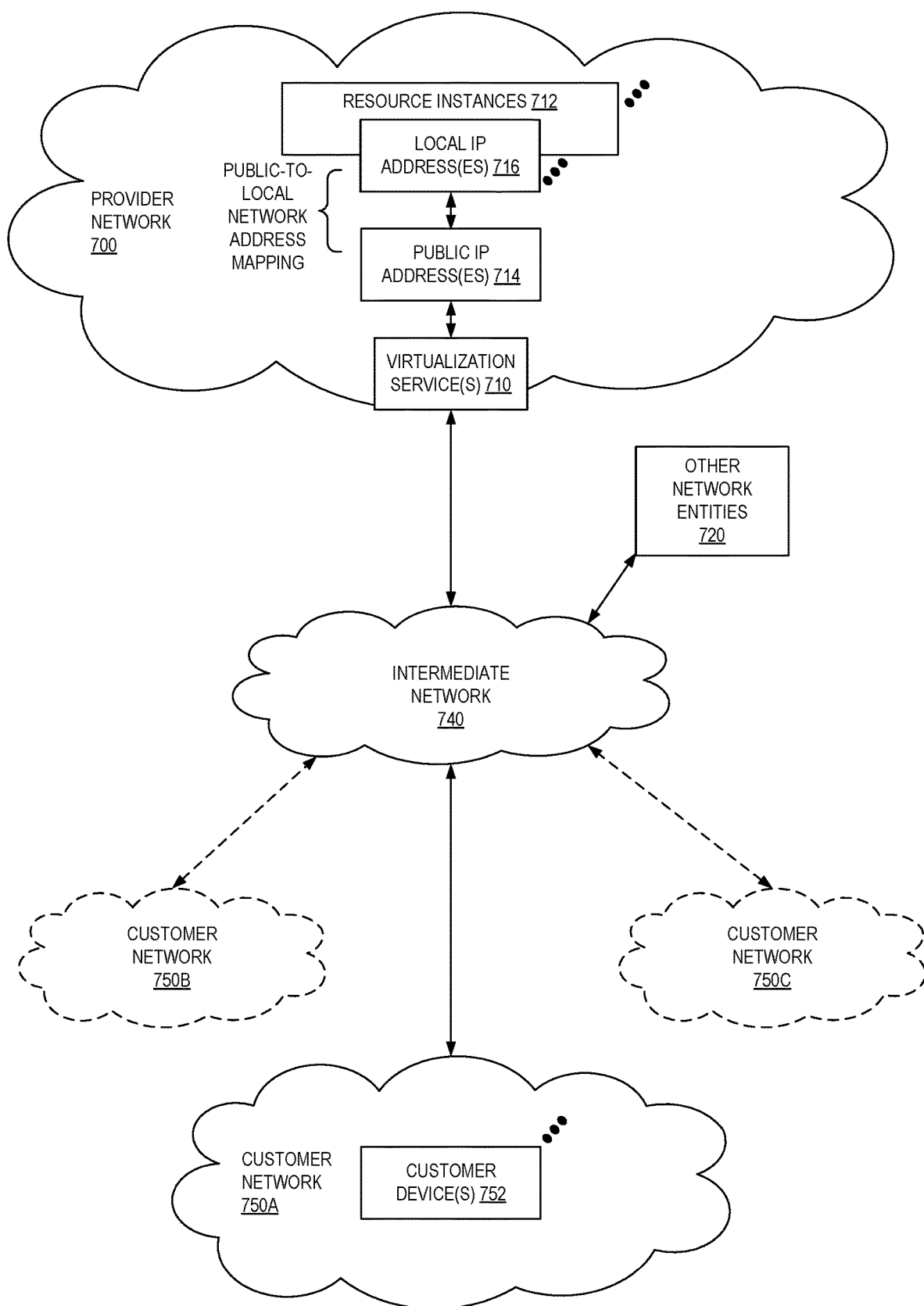
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
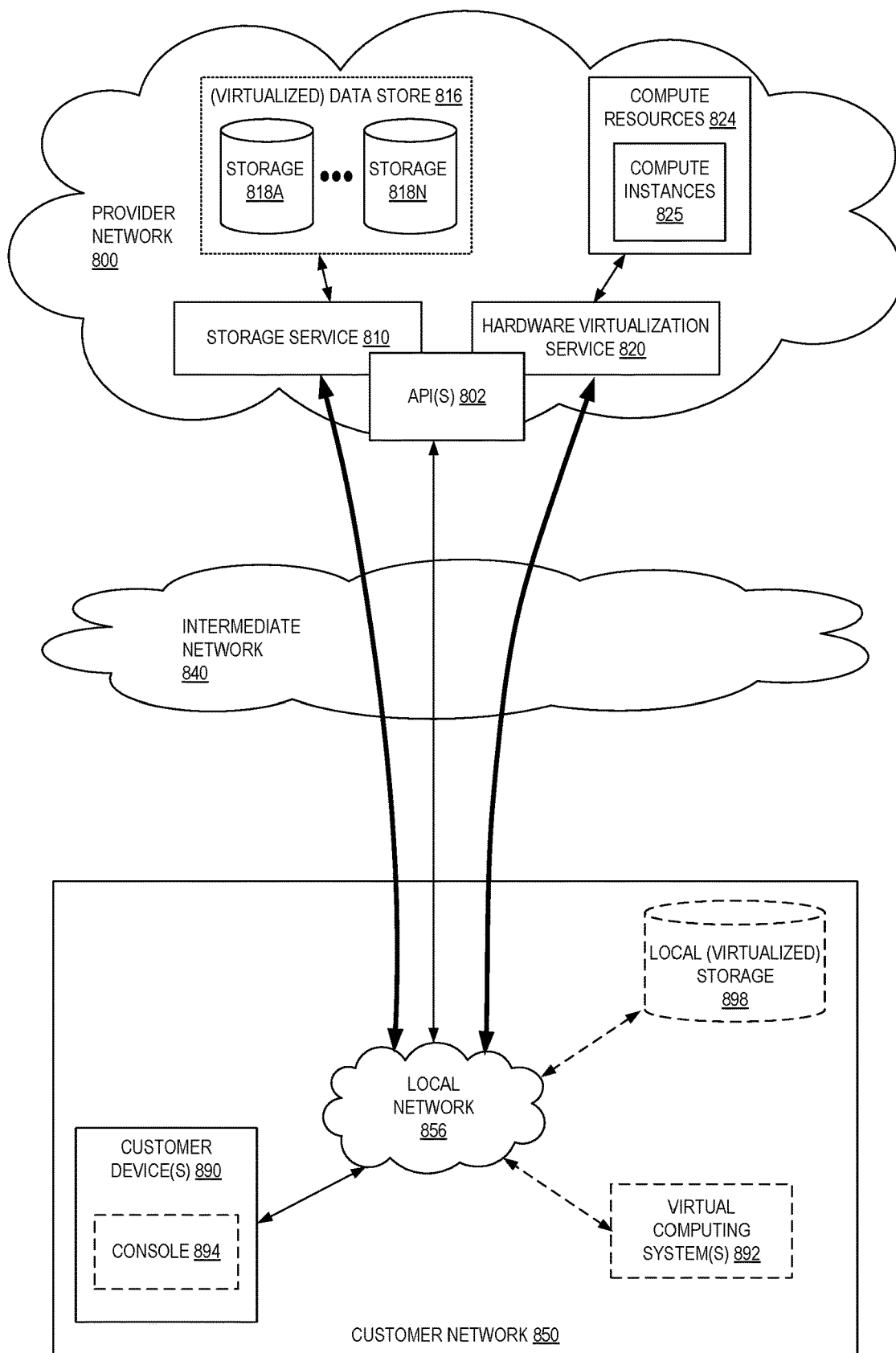
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
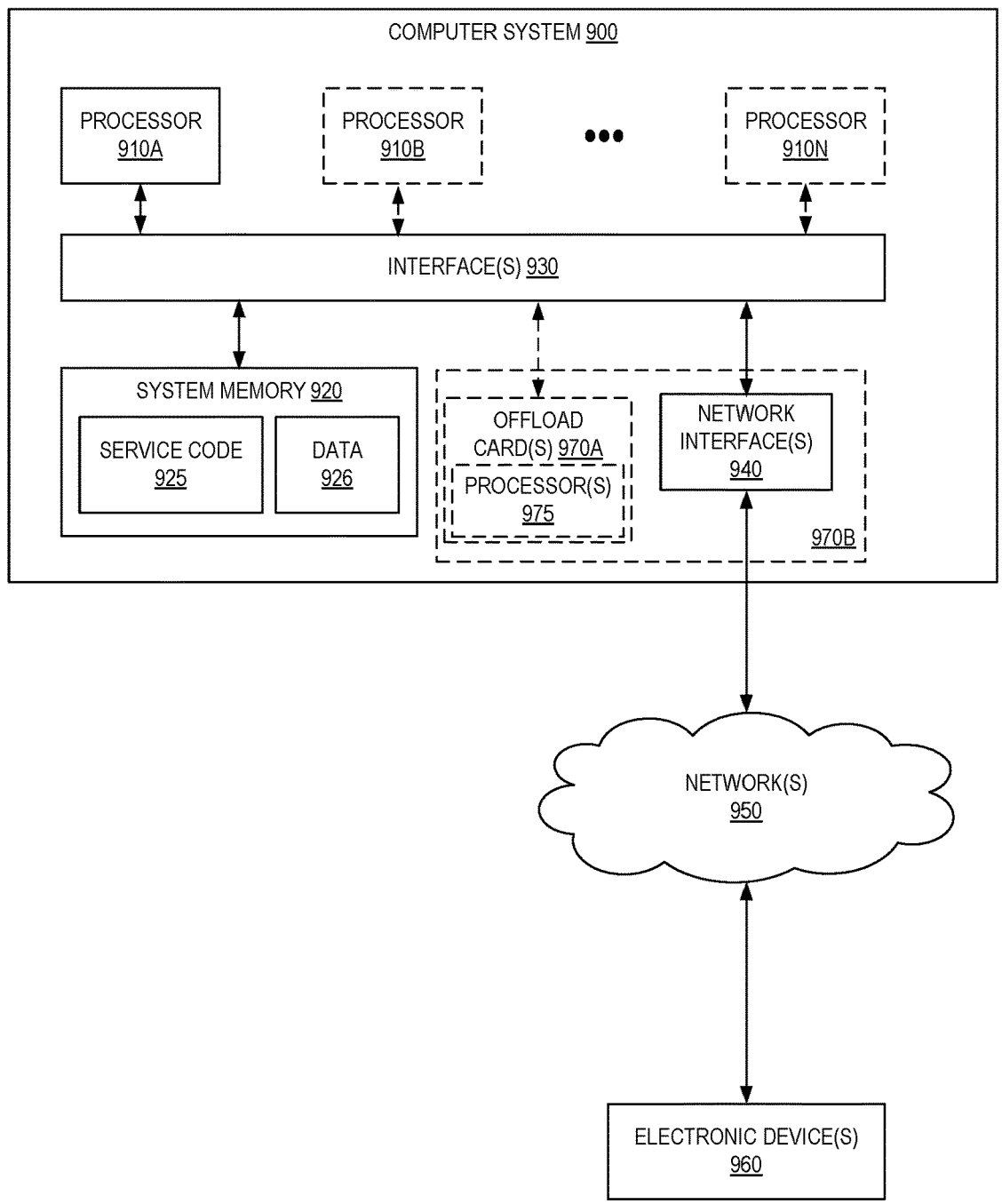
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as service code 925 (e.g., executable to implement, in whole or in part, the modernization service 102, modernization agent 130, and other components of the figures) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining, by a software agent running in a user's computing environment, application profile data identifying a plurality of software applications located in the user's computing environment, wherein the application profile data includes, for a first software application of the plurality of software applications, an identifier of a first binary executable file associated with the first software application;
    sending a request to an automation server to obtain a plurality of workflow configurations stored by the automation server, wherein a workflow configuration of the plurality of workflow configurations defines a build and deployment pipeline for the first software application;
    determining that the workflow configuration includes an identifier of the first binary executable file, wherein the workflow configuration further includes an identifier of a first source code repository storing source code used to implement the first software application;
    storing data indicating a mapping between the first software application and the first source code repository;
    determining that another workflow configuration matching a second binary executable file associated with a second software application does not exist in the plurality of workflow configurations;
    decomposing the second binary executable file to obtain decomposed application data;
    using a hash function to generate a signature based on the decomposed application data;
    comparing the signature against other signatures generated based on respective ones of a plurality of other source code repositories managed by a version control system to identify a match with a second source code repository from among the plurality of other source code repositories; and
    storing data indicating a second mapping between the second software application and the second source code repository.

2. The computer-implemented method of claim 1, wherein the decomposed application data includes identifiers of at least one of: a class associated with the second binary executable file, a method associated with the second binary executable file, a package associated with the second binary executable file, or a string literal.

3. The computer-implemented method of claim 1, further comprising:
    obtaining source code associated with the first software application from the first source code repository;
    performing a static analysis of the source code; and
    generating a modernization recommendation based at least in part on the static analysis of the source code.

4. A computer-implemented method comprising:
    obtaining application profile data identifying a plurality of software applications located in a user's computing environment, wherein the application profile data includes, for a first software application of the plurality of software applications, an identifier of a first binary executable file associated with the first software application;
    obtaining workflow configuration data from an automation server defining a build and deployment pipeline for the first software application;
    determining that the workflow configuration data is associated with an identifier of the first binary executable file, wherein the workflow configuration data further includes an identifier of a first source code repository storing source code used to implement the first software application; and
    storing data indicating a mapping between the first software application and the first source code repository;
    determining that a workflow configuration associated with a second binary executable file associated with a second software application does not exist in a plurality of workflow configurations obtained from the automation server;
    decomposing the second binary executable file to obtain decomposed application data;
    using a hash function to generate a hash map based on the decomposed application data;
    comparing the hash map against hash maps generated based on a plurality of other source code repositories managed by a version control system to identify a matching second source code repository of the plurality of other source code repositories; and
    storing data indicating a second mapping between the second software application and the second source code repository.

5. The computer-implemented method of claim 4, wherein the decomposed application data includes identifiers of at least one of: a class associated with the second binary executable file, a method associated with the second binary executable file, or a package associated with the second binary executable file.

6. The computer-implemented method of claim 4, further comprising:
    obtaining source code associated with the first software application from the first source code repository;
    performing a static analysis of the source code; and
    generating a modernization recommendation based at least in part on the static analysis of the source code.

7. The computer-implemented method of claim 4, further comprising providing a software agent for installation in the user's computing environment, and wherein the software agent collects the application profile data further including at least one of: an indication of a programming language used to implement the first software application, an indication of a dependency with a software package, or an indication of a software framework dependency.

8. The computer-implemented method of claim 4, wherein obtaining the workflow configuration data includes sending an application programming interface (API) request to the automation server requesting the workflow configuration data, wherein the workflow configuration data defines a series of automated steps of the build and deployment pipeline, and wherein the workflow configuration data includes a first parameter identifying the first binary executable file and a second parameter identifying the first source code repository.

9. The computer-implemented method of claim 4, wherein a modernization service of a cloud provider network obtains the application profile data from a software agent installed in the user's computing environment, wherein a modernization service obtains the workflow configuration data from the automation server by sending an application programming interface (API) request to the automation server requesting the workflow configuration data, and wherein the method further comprises:
  obtaining, by the modernization service, the source code used to implement the first software application from the first source code repository using a web address identifying the first source code repository; and
  generating a modernization recommendation based at least in part on a static analysis of the source code.

10. The computer-implemented method of claim 4, further comprising:
  determining that a workflow configuration associated with a third binary executable file associated with a third software application does not exist in the plurality of workflow configurations;
  obtaining a symbol table associated with the third binary executable file, wherein the symbol table includes symbol table data including indications of at least one of: a class associated with the third binary executable file, a method associated with the third binary executable file, a package associated with the third binary executable file, or a string literal;
  comparing the symbol table data to source code contained in the plurality of other source code repositories to identify a match between the symbol table data and a third source code repository of the plurality of other source code repositories; and
  storing data indicating a third mapping between the second third software application and the third source code repository.

11. The computer-implemented method of claim 4, further comprising:
  determining that a workflow configuration associated with a third binary executable file associated with a third software application does not exist in the plurality of workflow configurations;
  disassembling the third binary executable file to obtain first assembly code data, wherein the first assembly code data includes indications of at least one of: a class associated with the third binary executable file, a method associated with the third binary executable file, or a package associated with the third binary executable file;
  compiling source code contained in a third source code repository of the plurality of other source code repositories to obtain second assembly code data;
  comparing the first assembly code data and the second assembly code data to identify a match between the third binary executable file and the third source code repository; and
  storing data indicating a third mapping between the second third software application and the third source code repository.

12. The computer-implemented method of claim 4, further comprising:
  identifying a programming language used to implement a third binary executable file associated with a third software application;
  filtering the plurality of other source code repositories by identifying source code repositories from among the plurality of other source code repositories that are associated with the programming language to obtain a plurality of candidate source code repositories; and
  analyzing the plurality of candidate source code repositories to identify a third mapping between the third software application and a third source code repository from among the plurality of candidate source code repositories.

13. The computer-implemented method of claim 4, further comprising:
  determining that a workflow configuration matching a third binary executable file associated with a third software application does not exist in the plurality of workflow configurations;
  decomposing the third binary executable file to obtain additional decomposed application data, wherein the additional decomposed application data includes identifiers of two or more of: a class associated with the third binary executable file, a method associated with the third binary executable file, a package associated with the third binary executable file, or string literals;
  using a hash function to generate an additional hash map based on the additional decomposed application data, wherein the additional hash map includes a plurality of hash values generated based on the identifiers included in the additional decomposed application data;
  comparing the additional hash map against hash maps generated based on the plurality of other source code repositories to identify a matching third source code repository of the plurality of other source code repositories, wherein the comparison applies respective weights to each type of identifier included in the additional decomposed application data; and
  storing data indicating a third mapping between the third software application and the third source code repository.

14. The computer-implemented method of claim 4, further comprising:
  causing display of a graphical user interface (GUI) including an indication of the mapping between the first software application and the first source code repository, wherein the GUI further includes a first interface element enabling user input confirming the mapping between the first software application and the first source code repository, and a second interface element enabling user input modifying the mapping between the first software application and the first source code repository.

15. A system comprising:
  a first one or more electronic devices implementing a modernization service in a cloud provider network, wherein the modernization service includes one or more first processors and first memory storing instructions that upon execution by the one or more first processors cause the modernization service to:

obtain application profile data identifying a plurality of software applications located in a user's computing environment, wherein the application profile data includes, for a first software application of the plurality of software applications, an identifier of a first binary executable file associated with the first software application;

send a request to an automation server to obtain a plurality of workflow configurations stored by the automation server, wherein a first workflow configuration of the plurality of workflow configurations defines a build and deployment pipeline for the first software application;

determine that the first workflow configuration is associated with an identifier of the first binary executable file, wherein the first workflow configuration further includes an identifier of a first source code repository storing source code used to implement the first software application;

store data indicating a mapping between the first software application and the first source code repository;

determine that a second workflow configuration associated with a second binary executable file associated with a second software application does not exist in the plurality of workflow configurations;

decompose the second binary executable file to obtain decomposed application data;

use a hash function to generate a hash map based on the decomposed application data;

compare the hash map against hash maps generated based on a plurality of other source code repositories managed by a version control system to identify a matching second source code repository of the plurality of other source code repositories; and store data indicating a second mapping between the second software application and the second source code repository; and a second one or more electronic devices to implement implementing a modernization agent, wherein the modernization agent includes one or more second processors and second memory storing instructions that upon execution by the one or more second processors cause the modernization agent to:

generate the application profile data; and send the application profile data to the modernization service.

16. The system of claim 15, wherein the decomposed application data includes identifiers of at least one of: a class associated with the second binary executable file, a method associated with the second binary executable file, or a package associated with the second binary executable file.

17. The system of claim 15, wherein the modernization service further includes instructions that upon execution cause the modernization service to:

obtain source code associated with the first software application from the first source code repository;

perform a static analysis of the source code; and generate a modernization recommendation based at least in part on the static analysis of the source code.

18. The system of claim 15, wherein the modernization service further includes instructions that upon execution cause the modernization service to provide a software agent for installation in the user's computing environment, and wherein the software agent collects the application profile data further including at least one of: an indication of a programming language used to implement the first software application, an indication of a dependency with a software package, or an indication of a software framework dependency.

19. The system of claim 15, wherein obtaining the workflow configuration data includes sending an application programming interface (API) request to the automation server requesting the workflow configuration data, wherein the workflow configuration data is specified using a pipeline syntax defining a series of automated steps of the build and deployment pipeline, and wherein the workflow configuration data includes a first parameter identifying the first binary executable file and a second parameter identifying the first source code repository.

20. The system of claim 15, wherein the modernization service includes further instructions that upon execution further cause the modernization service to:

determine that a workflow configuration matching a third binary executable file associated with a third software application does not exist in the plurality of workflow configurations;

obtain a symbol table associated with the third binary executable file, wherein the symbol table includes symbol table data including indications of at least one of: a class associated with the third binary executable file, a method associated with the third binary executable file, or a package associated with the third binary executable file;

use a hash function to generate a hash signature based on the symbol table data;

compare the hash signature against hash signatures generated based on the plurality of other source code repositories to identifying a matching third source code repository of the plurality of other source code repositories; and store data indicating a third mapping between the third software application and the third source code repository.

* * * * *